United States Patent
Georgi et al.

(10) Patent No.: US 8,342,754 B2
(45) Date of Patent: Jan. 1, 2013

(54) ROLLING BEARING AND BEARING ARRANGEMENT COMPRISING A ROLLING BEARING

(75) Inventors: Jan Georgi, Niederwerrn (DE); Martin Stuerzenberger, Euerbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 658 days.

(21) Appl. No.: 12/597,565

(22) PCT Filed: Apr. 16, 2008

(86) PCT No.: PCT/DE2008/000654
§ 371 (c)(1),
(2), (4) Date: Oct. 26, 2009

(87) PCT Pub. No.: WO2008/131725
PCT Pub. Date: Nov. 6, 2008

(65) Prior Publication Data
US 2010/0215306 A1 Aug. 26, 2010

(30) Foreign Application Priority Data
Apr. 27, 2007 (DE) .......................... 10 2007 019 881

(51) Int. Cl.
*F16C 33/58* (2006.01)
(52) U.S. Cl. ........................................ 384/564
(58) Field of Classification Search .................. 384/548, 384/559, 560, 563, 564, 571
See application file for complete search history.

(56) References Cited

U.S. PATENT DOCUMENTS

| | | | | | |
|---|---|---|---|---|---|
| 2,836,473 | A | * | 5/1958 | Tydeman | 384/563 |
| 3,144,283 | A | * | 8/1964 | Gammet | 384/563 |
| 3,716,244 | A | * | 2/1973 | Hellwig | 384/484 |
| 3,746,412 | A | | 7/1973 | Hay | |
| 3,901,568 | A | * | 8/1975 | Gadd et al. | 384/589 |
| 5,046,870 | A | * | 9/1991 | Ordo | 384/563 |

FOREIGN PATENT DOCUMENTS

| DE | 69 17 609 A | | 9/1969 |
|---|---|---|---|
| DE | 25 32 313 A | | 3/1976 |
| JP | 2000356219 A | * | 12/2000 |
| JP | 2002235740 A | * | 8/2002 |

* cited by examiner

*Primary Examiner* — Phillip A Johnson
(74) *Attorney, Agent, or Firm* — Lucas & Mercanti, LLP; Klaus P. Stoffel

(57) ABSTRACT

A rolling bearing, which has a shoulder loose or separately mounted shoulder ring aiding assembly capacity in defined structural forms of rolling bearings or which adjusts axial play of rolling bodies in a targeted manner by adapting the separate shoulder rings. A rolling bearing, which has a first and second bearing ring and a plurality of rolling bodies. The bearing rings being are arranged in relation to each other by the rolling bodies such that they can rotate about a common axis. A shoulder body forms an edge for axial arrangement of the rolling body and lies on a front ring supporting surface of one of the bearing rings by a front shoulder supporting surface. The shoulder supporting surface and the ring supporting surface are designed such that the axial position of the edge is modified in the event of a mutual rotation of the shoulder body and bearing ring.

20 Claims, 4 Drawing Sheets

ROLLING BEARING AND BEARING ARRANGEMENT COMPRISING A ROLLING BEARING

This application is a 371 of PCT/DE2008/000654 filed Apr. 16, 2008, which in turn claims the priority of DE 10 2007 019 881.9 filed Apr. 27, 2007, the priority of both applications is hereby claimed and both applications are incorporated by reference herein.

FIELD OF THE INVENTION

The invention relates to a rolling bearing having a first and a second bearing ring, having a multiplicity of rolling bodies, with the first and second bearing rings being arranged so as to be rotatable relative to one another about a common axis by means of the multiplicity of rolling bodies, having a flange body which forms a flange for axial contact of the rolling bodies and which bears with an end-side flange contact surface against an end-side ring contact surface of one of the bearing rings.

Rolling bearings of said type, for example radial rolling bearings, often have a flange disk, which must be mounted separately or which is loose, as a flange body, resulting firstly in assembly advantages in certain designs of rolling bearings or radial rolling bearings. Secondly, rolling bearings or radial rolling bearings with separate flange disks are often used in order to be able to adapt the axial play of the rolling bodies in a targeted fashion.

However, the precise adjustment of the axial play of the rolling bodies in the rolling bearing or radial rolling bearing is associated with numerous practical problems in the production or in the assembly of said rolling bearings in a unit on account of production tolerances of the individual components of the rolling bearing or of the unit.

To compensate such production tolerances and to adjust the axial play, it is for example conventional to insert adjusting washers between the rolling bearings or radial rolling bearings. The thickness of the adjusting washers is—with known tolerances—determined by a preceding measurement of the actual dimensions of the individual components of the unit to be assembled, or of the rolling bearing, of the housing and of the shaft or of shaft shoulders.

On the basis of said thickness, an adjusting washer which is precisely adapted to the tolerances is selected and used.

In alternative approaches, the actual dimensions of the individual components are estimated by means of statistical variables and use is made of an adjusting washer which would, with high probability, produce the desired axial play/preload. When installing adjusting washers which are estimated in this way, a subsequent final check of the bearing setting (play/preload) which is obtained, is generally carried out. If said bearing setting deviates to too great an extent from corresponding specifications, a unit or rolling bearing which is assembled in this way must be disassembled again, the adjusting washer must be exchanged, and the unit or the rolling bearing must be assembled again.

The known approaches are therefore associated either with a high expenditure of work or a remaining residual uncertainty of incorrect axial play.

In further alternative approaches, the rolling bearings of a unit are installed with play but also under load (with preload).

A radial rolling bearing having a separate flange disk is presented for example in publication DE 3923111 A1 by Haase et al., and possibly forms the closest prior art.

SUMMARY OF THE INVENTION

The invention is based on the object of proposing a rolling bearing which permits simple assembly in a bearing arrangement, and also a corresponding bearing arrangement.

According to the invention, a rolling bearing is proposed having a first and a second bearing ring and having a multiplicity of rolling bodies which are arranged between the first and the second bearing ring in such a way that said first and second bearing rings are mounted so as to be rotatable relative to one another about a common axis.

The bearing rings have raceways, which are arranged opposite and/or concentrically with respect to one another, for the rolling bodies and may be in each case of single-part or multi-part design. In possible embodiments of the invention, the rolling bodies may be arranged in one row, and in other embodiments, the rolling bodies may be arranged in two or more rows.

The rolling bearing comprises at least one flange body which is formed as a separate or loose part and which forms a flange for axial contact or for axial abutment at least for one part of the rolling bodies. In particular, the rolling bearing is designed such that radially acting forces are absorbed by the bearing rings, and axially acting forces from the outside, and also axial reaction forces from the rolling bearing, are dissipated by the flange or the flange body.

The flange body has an end-side flange contact surface, that is to say a flange contact surface which is aligned perpendicular to the common axis, which faces toward the one or more bearing rings and which bears against an end-side ring contact surface, that is to say a ring contact surface which is arranged perpendicular to the common axis, of one of the bearing rings. The flange body is therefore supported directly, in particular without the interposition of further elements, on one of the bearing rings.

It is provided according to the invention that the flange contact surface and the ring contact surface are designed such that the axial position of the flange is varied in the event of a twisting of the flange body and bearing ring, or of the flange contact surface and ring contact surface, relative to one another. In particular, the flange is loaded such that the preload and/or the axial play of the radial rolling bearing is varied. Here, the axial play is preferably defined as the dimension when the bearings are not installed, by which the bearing rings can be moved with respect to one another in the axial direction from one end position to the other as far as load-free contact.

With the design of the radial rolling bearing according to the invention, it is possible for the axial play or the preload to be adjusted in a targeted fashion in radial rolling bearings which have already been installed in units. It is therefore possible to substantially or entirely dispense with the use of adjusting washers. At least the cumbersome and fault-prone selection of the adjusting washers is eliminated. The cumbersome disassembly of a rolling bearing for exchanging adjusting washers is likewise not necessary.

Furthermore, the solution offers the option of re-adjusting the preload or the axial play after a running-in process and after corresponding settling processes of the unit. A further advantage of the proposed solution is that the groove which is required—in the case of a single-part design of the bearing ring and support flange—between the raceway and contact surface of the support flange may be dispensed with, such that the raceway on the corresponding bearing ring is of complete design.

In a preferred embodiment of the invention, the flange contact surface and/or the ring contact surface each have a gradient profiling, which gradient profilings lead to the variation in the axial position of the flange in the event of a relative twisting. Said gradient profiling is preferably designed such that the flange contact surface and/or ring contact surface is or are divided into a plurality of segments, for example into three segments, with each segment having, in the circumferential direction, a ramp which ascends or descends in the direction of the common axis. The ramp is preferably formed with a constant and/or monotonous and/or with a strictly monotonous gradient.

The gradient profiling is preferably designed, in particular with the selection of a correspondingly large transmission ratio, that is to say with a suitable gradient of the ramps as a function of the roll angle, in such a way as to enable precise stepless adjustment of the axial position of the flange by means of a twisting of the flange body relative to the corresponding bearing ring.

In alternative embodiments, the ramp is of stepped design, such that different, fixed spacings defined by the step height can be set as a function of the relative rotational angle between the flange body and bearing ring. In the stepped design, it is preferable for the contact surfaces of the steps to be formed perpendicular to the longitudinal extent of the common axis, since after the installation under preload, with axial clamping, no restoring torque is produced.

In one refinement of the invention, the ramps additionally have a gradient in the radial direction and/or a pressure angle such that an axial clamping of the radial rolling bearing, for example by means of a shaft nut, leads to a radial force component and centering of the flange disk on the bearing ring.

In order to achieve the effect of the change in position of the flange, it is preferable for the ramps of the segments of a contact surface to be aligned in the same direction, and for the ramps of the counterpart contact surface to be aligned in each case mirror-inverted thereto. The gradients of the ramps of the contact surface and counterpart contact surface are equal in magnitude.

One particularly preferred embodiment is present, when the flange contact surface and the ring contact surface have three ramps each, or are divided into three segments. In said design, it is provided in particular that the flange body rests on the bearing ring in a defined and tilt-free manner in a three-point mounting.

In one preferred refinement of the invention, the flange engages at least in sections into the race ring, in particular in such a way that a raceway of the race ring is overlapped at least in sections in the axial direction. Said design ensures that, during the axial movement of the flange body or of the flange, only additional sections of the raceway of the race ring are covered or uncovered by the flange.

Even though the flange body may have any desired shape and may for example also be part of a further, complex product, it is preferable for the flange body to be formed as a flange disk, in particular as a flange disk produced by shaping.

In the installed situation, the fixing of the flange body to prevent an undesired twisting relative to the bearing ring is obtained for example by means of frictional and/or force-fitting engagement, by virtue of the rolling bearing being installed with an axially acting load, or axially clamped. In one preferred embodiment, it is additionally possible to provide securing devices to prevent an uncontrolled adjustment of the flange body in the installed state, which securing devices are formed in particular as friction-increasing devices. For this purpose, it is for example possible for profilings, toothings, in particular Hirth toothings, coatings, adhesive films or the like to be applied to or formed in the flange contact surface and/or the ring contact surface.

In a first possible alternative design, the ring contact surface is assigned to the bearing ring which forms the inner ring, with the flange engaging into the inner ring and delimiting the raceway of the inner ring.

In one advantageous realization, in order to enable the flange body to be adjusted, that is to say to enable a twisting of the flange body relative to the inner ring, the free inner diameter of the inner ring which is seated on an axle or shaft is smaller than the free inner diameter of the flange body which is arranged on the same shaft or axle.

In another alternative design, the ring contact surface is assigned to the bearing ring which forms the outer ring, wherein in said alternative design, the relative rotation is enabled by virtue of the maximum outer diameter of the inner ring being greater than the maximum outer diameter of the flange body.

In further design alternatives, in each case one flange body or a common flange body is provided for the inner ring and for the outer ring.

In principle, the rolling bearing may be of any desired design. Said rolling bearing is preferably a radial rolling bearing, but it is particularly preferable for said rolling bearing to be designed as a tapered-roller bearing, tapered-roller bearing set, in particular in an 0-type arrangement since the flange body or bodies may be arranged in each case at the outer side in said arrangement, or as a cylindrical-roller bearing.

A further subject matter of the invention relates to a bearing arrangement which is designed in particular as a pinion shaft bearing arrangement, having a housing, having a shaft or an axle and having at least one rolling bearing as described immediately above or as claimed in one of the preceding claims, in particular a radial rolling bearing, with the axle or shaft being mounted in the housing by means of the rolling bearing or radial rolling bearing.

In connection with the rolling bearing, in particular radial rolling bearing, according to the invention, it is particularly preferable for the inner ring to be pressed onto, and in particular arranged in a rotationally fixed manner on, the shaft or the axle and/or for the outer ring to be pressed into, and/or arranged in a rotationally fixed manner in, the housing. To ensure adjustability of the radial rolling bearing, the flange body is arranged on the shaft or axle and/or in the housing with a transition fit and/or with an interference fit, which allows the flange body to rotate. Said embodiment has the advantage of a secure press fit of the one or more bearing rings under radial loading, with the radially loaded part of the radial rolling bearing in the region of the raceway of the bearing rings being produced with standard bores, and being pressed with a press fit onto the shaft or axle. That part of the radial rolling bearing which is, in particular, subjected to exclusively axial loading, specifically the flange body which acts as an axial support flange, has a central bore which leads, at the shaft seat, to a transition fit or interference fit which allows the flange body to rotate.

The flange is installed with play relative to the bearing rings, said play preferably being greater than the play relative to the axle or shaft or to the housing of the flange body.

To permanently secure the set angular position of the flange body, it is preferable for the rolling bearing or radial rolling bearing to be axially secured or axially clamped by means of a screw connection. The clamping forces usually exceed the expected axial operating forces considerably, so as to minimize the deflection as a result of elastic deformation of the components. Here, the outer ring of the rolling bearing bears in particular at one side against a housing shoulder. Within the context of the axial clamping, it is also possible for the loose flange body to also be clamped in a rotationally fixed manner.

The rolling bearing or the radial rolling bearing is particularly preferably clamped relative to the housing in the axial direction by means of a shaft nut or axle nut.

Another option for securing the flange body is for the flange body to have, on the side facing away from the flange contact surface, a conical contact surface which is arranged coaxially with respect to the common axis and which is designed to hold a conical ring which is arranged coaxially with respect to the common axis and which is pressed onto or into the flange body, and fixes the latter, in the axial direction. The axial clamping forces which counteract a twisting can be further increased by means of a conical ring of said type.

Further features, advantages and effects of the invention emerge from the following description of preferred exemplary embodiments of the invention, and the appended figures, in which:

BRIEF DESCRIPTIONS OF THE DRAWINGS

DETAILED DESCRIPTION OF THE INVENTION

Identical or corresponding parts are provided with the same or corresponding reference signs in the figures.

Figure 1:
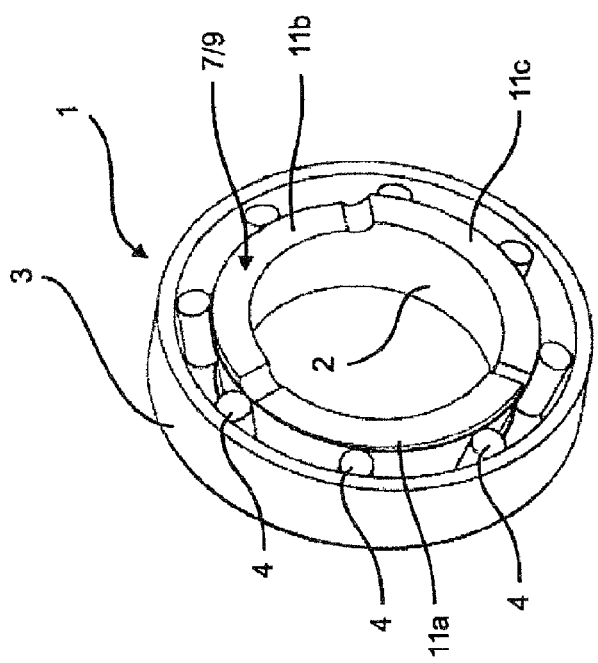

FIG. 1 shows, in a schematic three-dimensional view, a tapered-roller bearing 1 which has an inner ring 2, an outer ring 3 and a multiplicity of tapered rollers 4 arranged such that they can roll between the inner ring 2 and outer ring 3. The tapered rollers 4 are arranged so as to be inclined in relation to a common rotational axis (not shown), with FIG. 1 showing the plan view of the tapered-roller bearing 1 on the side with the radially outwardly directed ends of the tapered rollers 4.

Figure 2:
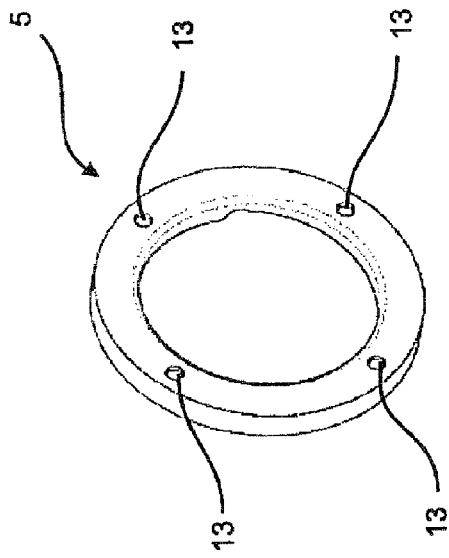
FIGS. 1-3 show different views of a tapered-roller bearing as a first exemplary embodiment of the invention.
Figure 3:
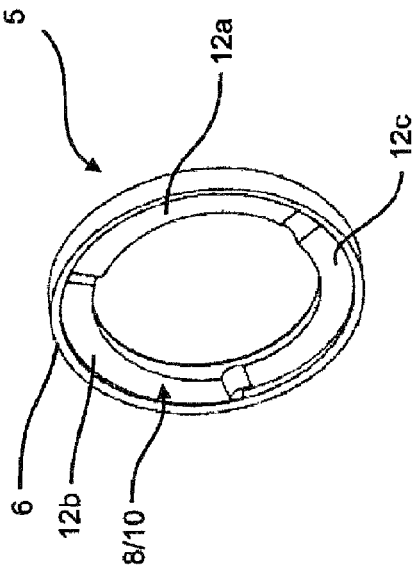

On this side, the inner ring 2 is formed without a flange. Instead of an integrally formed flange, the flange disk 5 is placed onto the inner ring 2, said flange disk 5 being illustrated in FIGS. 2 and 3 in a schematic three-dimensional illustration in a plan view obliquely from the front and from the rear, respectively. The flange disk 5 has an encircling edge which, in the installed state, projects as a flange 6 from the flange disk 5 in the direction of the common axis and engages around the inner ring 2 in such a way that the flange 6 forms a support flange or a run-on flange for the tapered rollers 4.

To be able to adjust the axial play and/or the preload of the tapered rollers 4 in the tapered-roller bearings 1, both the inner ring 2 and also the flange disk 5 have a gradient profiling 7 and 8 respectively, in each case at the end side. The effect obtained by means of the gradient profiling 7 and 8 is that a very precise, stepless adjustment of the axial position of the flange disk 5, and therefore of the flange 6, relative to the inner ring 2 can be set as a function of a roller angle by twisting the flange disk 5 relative to the inner ring 2.

Here, the gradient profiling 7 or 8, respectively, is formed on a ring contact surface 9 or flange contact surface 10, respectively, as a multiplicity of ramps 11a, b, c and 12 a, b, c, respectively running in the circumferential direction. The ramps 11a, b, c of the ring contact surface 9 are aligned so as to ascend in the circumferential direction. The respective minimum and maximum points of the ramps 11a, b, c lie in each case in a common plane which is aligned perpendicular to the common axis. Provided between the ramps 11a, b, c depressions are formed as semi-circular, radially running channels (outlet, recess).

The ramps 12a, b, c are formed analogously to the ramps 11a, b, c, but the gradient is aligned in exactly the opposite direction, such that, during a relative twisting of the flange disk 5 with respect to the inner ring 2, the flange 6 is moved in the axial direction.

To facilitate the twisting of the flange disk 5 relative to the inner ring 2, the flange disk 5 has axially running passage openings 13 which are distributed uniformly in the circumferential direction of the flange disk 5 and into which a suitable adjusting tool can engage. Alternatively, a hook wrench could engage into corresponding grooves in the outer diameter of the flange body/flange disk.

Figure 4:
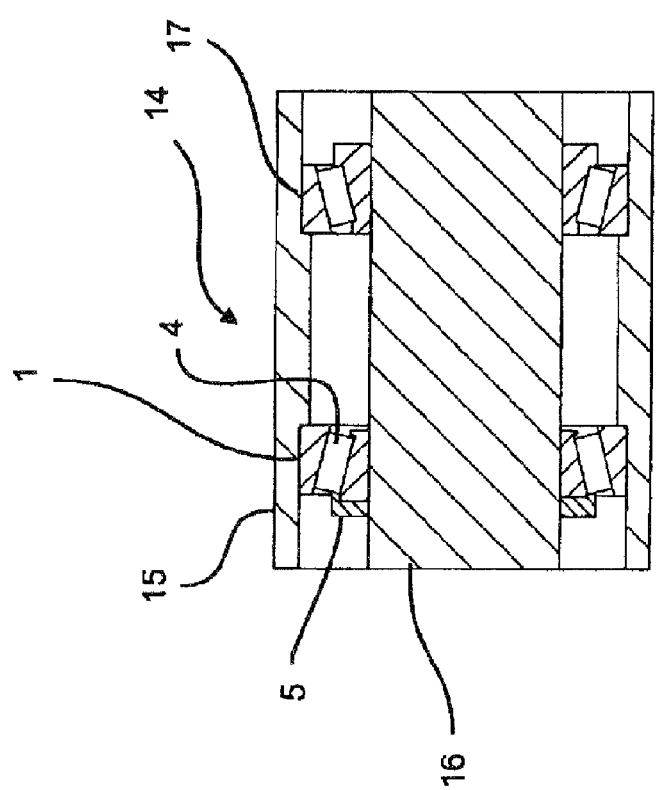

FIG. 4 shows a unit 14 which comprises a housing 15 in which a shaft 16 is mounted by means of two tapered-roller bearings 1 and 17 which are positioned in an O-type arrangement relative to one another. The tapered-roller bearing 1 at the left in the illustration of FIG. 4 has the flange disk 5, wherein in FIG. 4, the flange disk 5 is situated at its right-hand axial stop.

Figure 5:
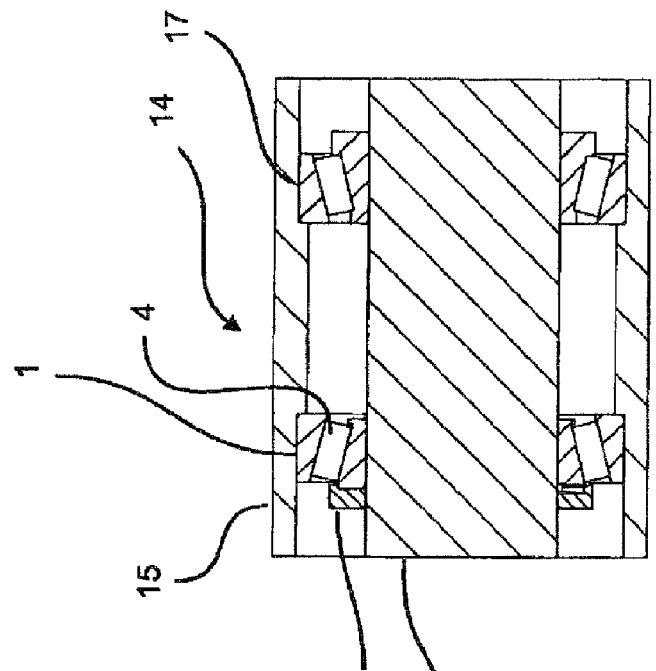
FIGS. 4 and 5 show a cross-sectional illustration of the tapered-roller bearing in FIGS. 1 to 3 in a unit.

FIG. 5 shows the same unit 14 but with the flange disk 5 in its left-hand axial extreme position, with the axial play maximized or the preload minimized.

Figure 7:
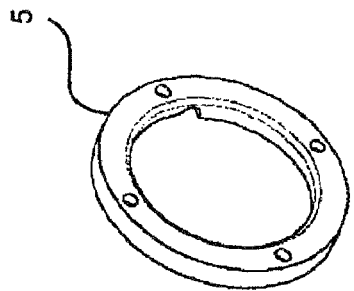
FIGS. 6 to 9 show different views of a cylindrical-roller bearing as a second exemplary embodiment of the invention.
Figure 8:
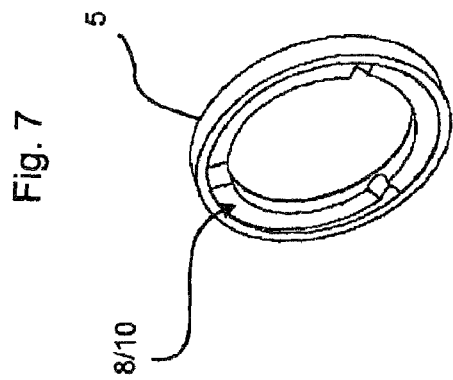
Figure 6:
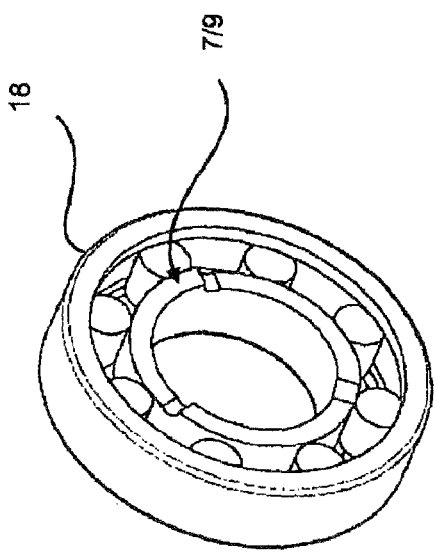

FIGS. 6 to 8 show a cylindrical roller bearing 18 having an adjustable flange disk 5 as a second exemplary embodiment of the invention. Cylindrical-roller bearings 18 of said type are used for example in rotary-piston blower. The cylindrical-roller bearing 18 also has a ring contact surface 9 which is provided with the gradient profiling 7 and which interacts with a flange contact surface 10, which is likewise provided a gradient profiling 8, in the same way as has already been described with regard to FIGS. 1 to 5.

Figure 9:
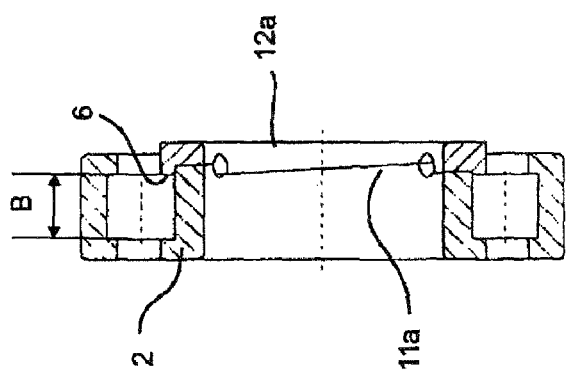

FIG. 9 shows the cylindrical-roller bearing 18 in a partially sectioned illustration, with the ramp 11a, which is assigned to the inner ring 2, and the ramp 12a, which is assigned to the flange disk 5, being visible in a plan view. It can be seen from the illustration that, if the flange disk 5 is twisted, the flange 6 is moved away from the inner ring 2 in the axial direction, such that the width B of the raceway of the inner ring 2 and, therefore, the axial play are increased.

Figure 10:
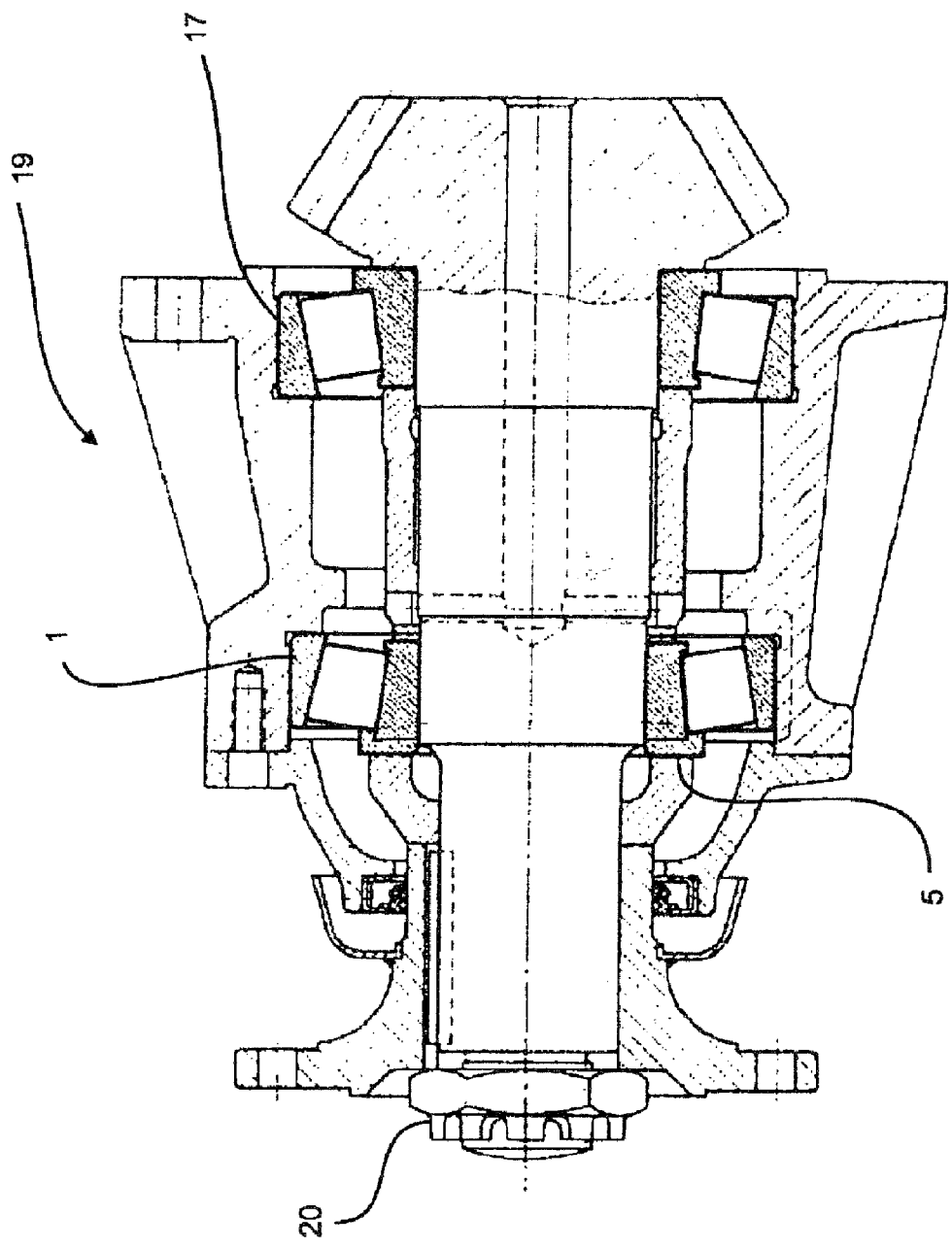
FIG. 10 shows a schematic cross-sectional illustration of a pinion shaft bearing arrangement having one or one of the other of the tapered-roller bearing according to the invention.

FIG. 10 shows, as an exemplary embodiment for a unit, a pinion shaft bearing arrangement 19 having tapered-roller bearing sets in an O-type arrangement, as is commonly used in axles of heavy utility vehicles. By way of example, the left-hand bearing is designed as a tapered-roller bearing 1 with a separate flange disk 5, such that the axial play of the bearing 1 can be adjusted in a stepless fashion by twisting the flange disk 5. The right-hand bearing is designed as a conventional tapered-roller bearing 17. In alternative embodiments, it is also possible for both tapered-roller bearings 1 and 17 to be provided with an adjustable flange disk 5.

The axial clamping of the bearings 1 and 17 is provided by means of a shaft nut 20. The use of the adjustable tapered-roller bearing 1 has the advantage that the axial play/radial play and/or the preload of the rolling bodies 4 of the tapered-roller bearing 1 can be adjusted by twisting the flange disk 5.

The adjustment may take place here on the one hand during an initial assembly; on the other hand, a re-adjustment may also take place after a running-in period of the pinion shaft bearing arrangement 19, wherein it is merely necessary to loosen the shaft nut 20, and the unit remains in the assembled state.

It is additionally possible here to provide a display facility which indicates the angle of twist between the flange body and bearing ring, for example a scale, which permits a direct reference to the set bearing play. It would then be possible for a unit composed of a bearing and a flange body, which unit has been "set to zero", to be pressed in as far as a stop, and for the bearing play to be measured. To set the required bearing play/preload, the flange body is then twisted by a certain angle, which can be read off directly.

| List of Reference Symbols | |
|---|---|
| 1 | Tapered-roller bearing |
| 2 | Inner ring |
| 3 | Outer ring |
| 4 | Tapered rollers, rolling bodies |
| 5 | Flange disk |
| 6 | Flange |
| 7 and 8 | Gradient profiling |
| 9 | Ring contact surface |
| 10 | Flange contact surface |
| 11 a, b, c | Ramps |
| 12 a, b, c | Ramps |
| 13 | Passage opening |
| 14 | Unit |
| 15 | Housing |
| 16 | Shaft |
| 17 | Tapered-roller bearing |
| 18 | Cylindrical-roller bearing |
| 19 | Pinion shaft bearing arrangement |
| 20 | Shaft nut |

The invention claimed is:

1. A rolling bearing, comprising:
a first bearing ring and a second bearing ring, having a multiplicity of rolling bodies, with the first bearing ring and the second bearing ring being arranged so as to be rotatable relative to one another about a common axis by means of a multiplicity of rolling bodies; and
a flange body, which forms a flange for axial contact of the rolling bodies and which bears with an end-side flange contact surface against an end-side ring contact surface of the first bearing ring or the second bearing ring,
wherein the flange contact surface and the ring contact surface are designed such that an axial position of the flange is varied in an event of a twisting of the flange body and the first bearing ring and the second bearing ring relative to one another.

2. The rolling bearing of claim 1, wherein the flange contact surface and/or the ring contact surface are/is divided into a plurality of segments, with each segment having a gradient or ramp in a circumferential direction.

3. The rolling bearing of claim 2, wherein ramp of the segments of the flange contact surface are aligned in a same direction and each ramp of the segments of the ring contact surface are aligned mirror-inverted thereto.

4. The rolling bearing of claim 2, wherein the flange contact surface and the ring contact surface have three or more ramps and/or are divided into three or more segments.

5. The rolling bearing of claim 2, wherein the gradient or ramp is formed conically so as to provide centering.

6. The rolling bearing of claim 1, wherein the flange engages at least in sections into the first bearing ring and the second bearing ring.

7. The rolling bearing of claim 1, wherein the flange body is designed as a flange ring.

8. The roiling bearing of claim 1, wherein the flange contact surface and/or ring contact surface have friction-increasing and/or positive-locking devices which are designed as a surface structuring.

9. The rolling bearing of claim 8, wherein the surface structuring is a Hirth toothing, a coating or an adhesive film.

10. The rolling bearing of claim 1, wherein the ring contact surface is assigned to the first bearing ring, which forms an inner ring.

11. The rolling bearing of claim 10, wherein a free inner diameter of the inner ring is smaller than a free inner diameter of the flange body.

12. The rolling bearing of claim 1, wherein the ring contact surface is assigned to the second bearing ring, which forms an outer ring.

13. The rolling bearing of claim 12 wherein a maximum outer diameter of the outer ring is greater than a maximum outer diameter of the flange body.

14. The rolling bearing of claim 1, wherein the rolling bearing is a tapered-roller bearing in an O-type arrangement or a cylindrical-roller bearing.

15. A pinion shaft bearing arrangement, comprising:
a housing having a shaft or an axle; and at least one rolling bearing as claimed in claim 1, with the axle or shaft being mounted in the housing by means of the rolling bearing.

16. The bearing arrangement of claim 15, wherein the first bearing ring is an inner ring is pressed onto the shaft or the axle and/or the second bearing ring is an outer ring is pressed into the housing.

17. The bearing arrangement of claim 16, wherein the flange body is arranged or fitted on the shaft or axle and/or in the housing with a transition fit twistable and/or movable.

18. The bearing arrangement of claim 15, wherein the rolling bearing is installed so as to be damped in an axial direction by means of a shaft or axle nut.

19. The bearing arrangement of claim 15, wherein the flange body has, on a side facing away from the flange contact surface, a conical recess which is arranged coaxially with respect to a common axis and which is designed correspondingly to a conical ring to increase a twisting resistance and/or as an anti-twist facility.

20. The bearing arrangement of claim 19, wherein a scale is provided to indicate an angle of twist between the flange body and the bearing ring.

* * * * *